Figure 4:
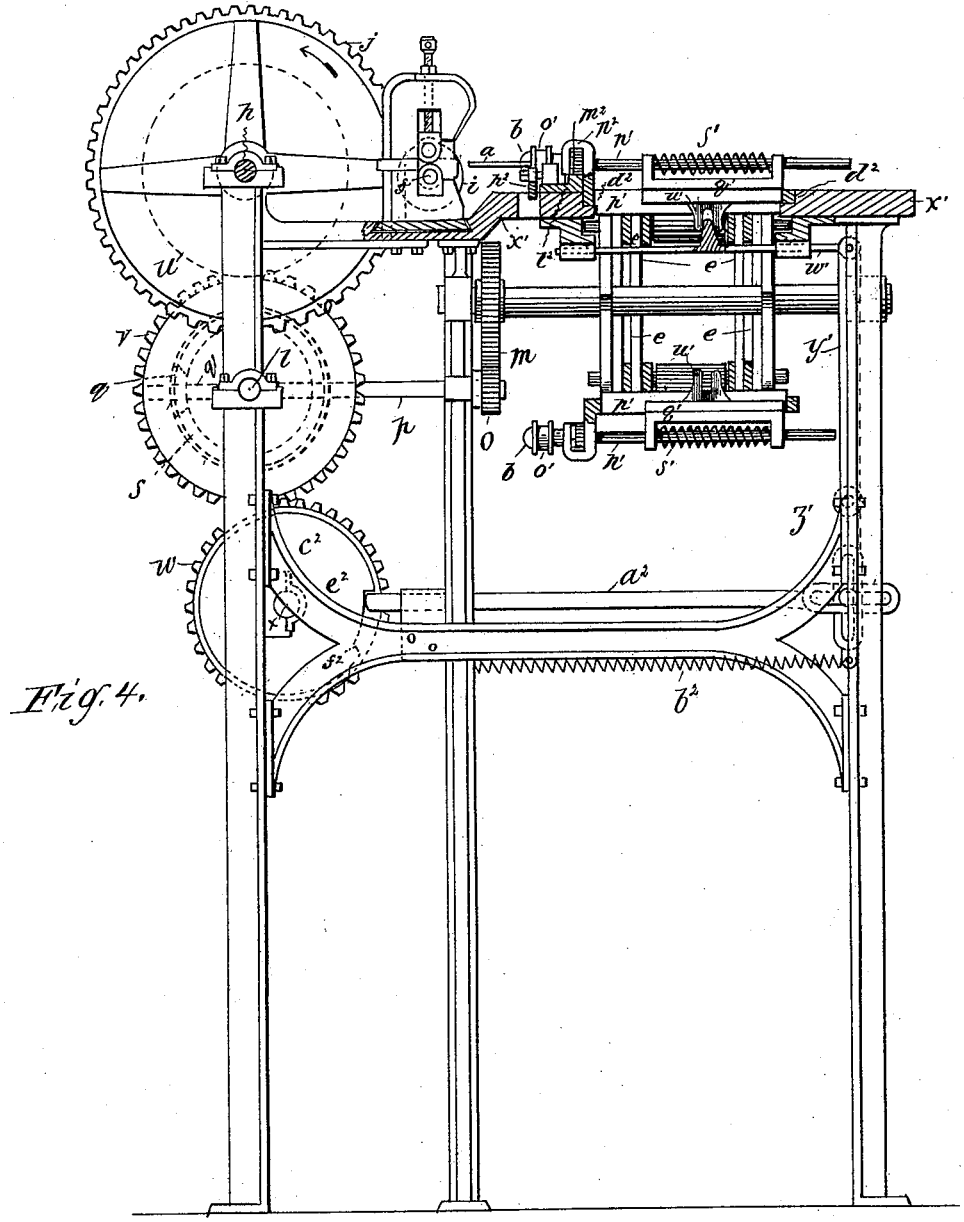

(No Model.)  5 Sheets—Sheet 1.
H. A. WILLIAMS.
MACHINE FOR MAKING HACKLE PINS, AWLS, &c.
No. 390,635.  Patented Oct. 2, 1888.
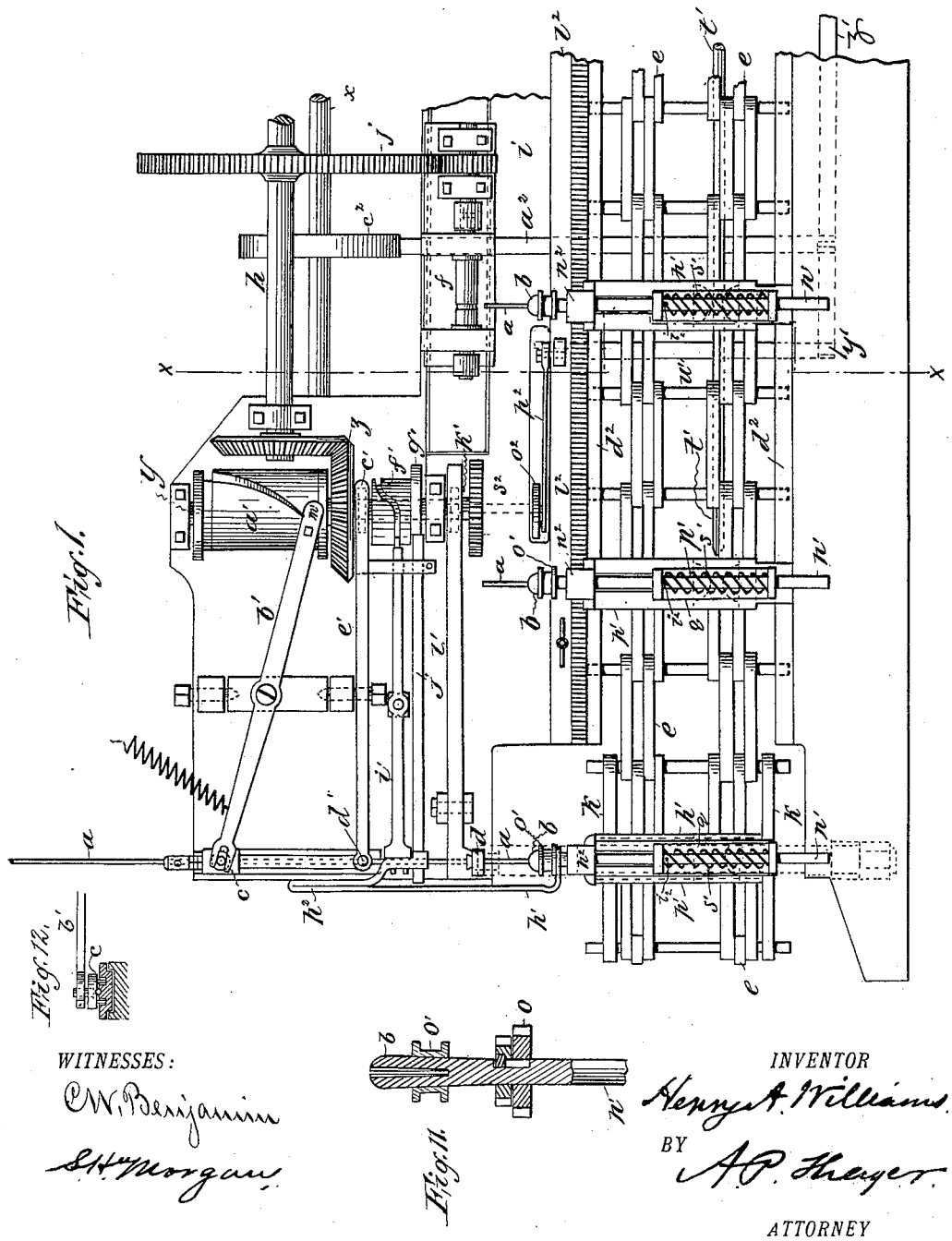
WITNESSES:
INVENTOR
Henry A. Williams
BY
A. P. Thayer
ATTORNEY (No Model.)  5 Sheets—Sheet 2.
H. A. WILLIAMS.
MACHINE FOR MAKING HACKLE PINS, AWLS, &c.
No. 390,635.  Patented Oct. 2, 1888.
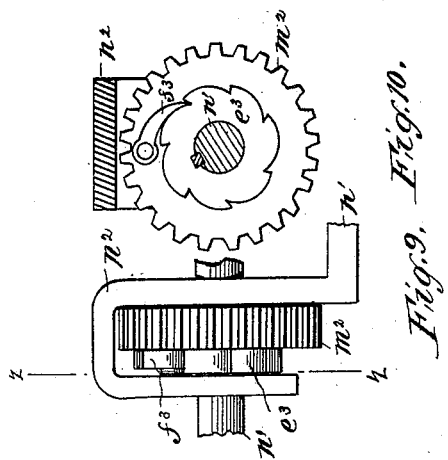
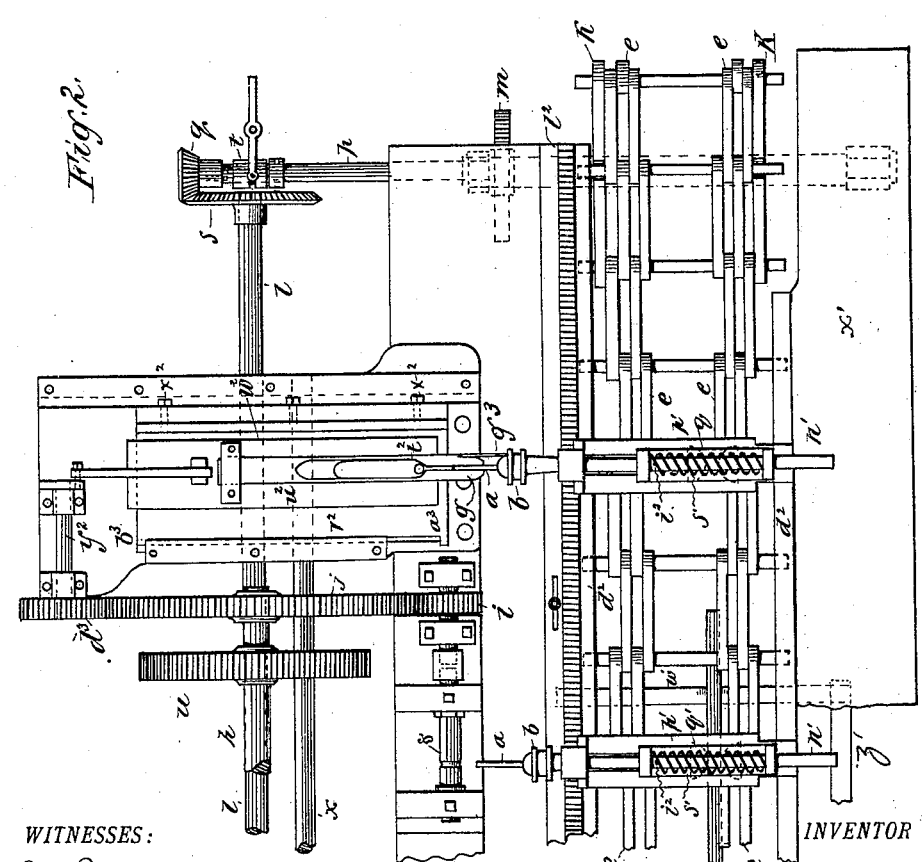
WITNESSES:
INVENTOR
Henry A. Williams
BY
A. P. Thayer,
ATTORNEY

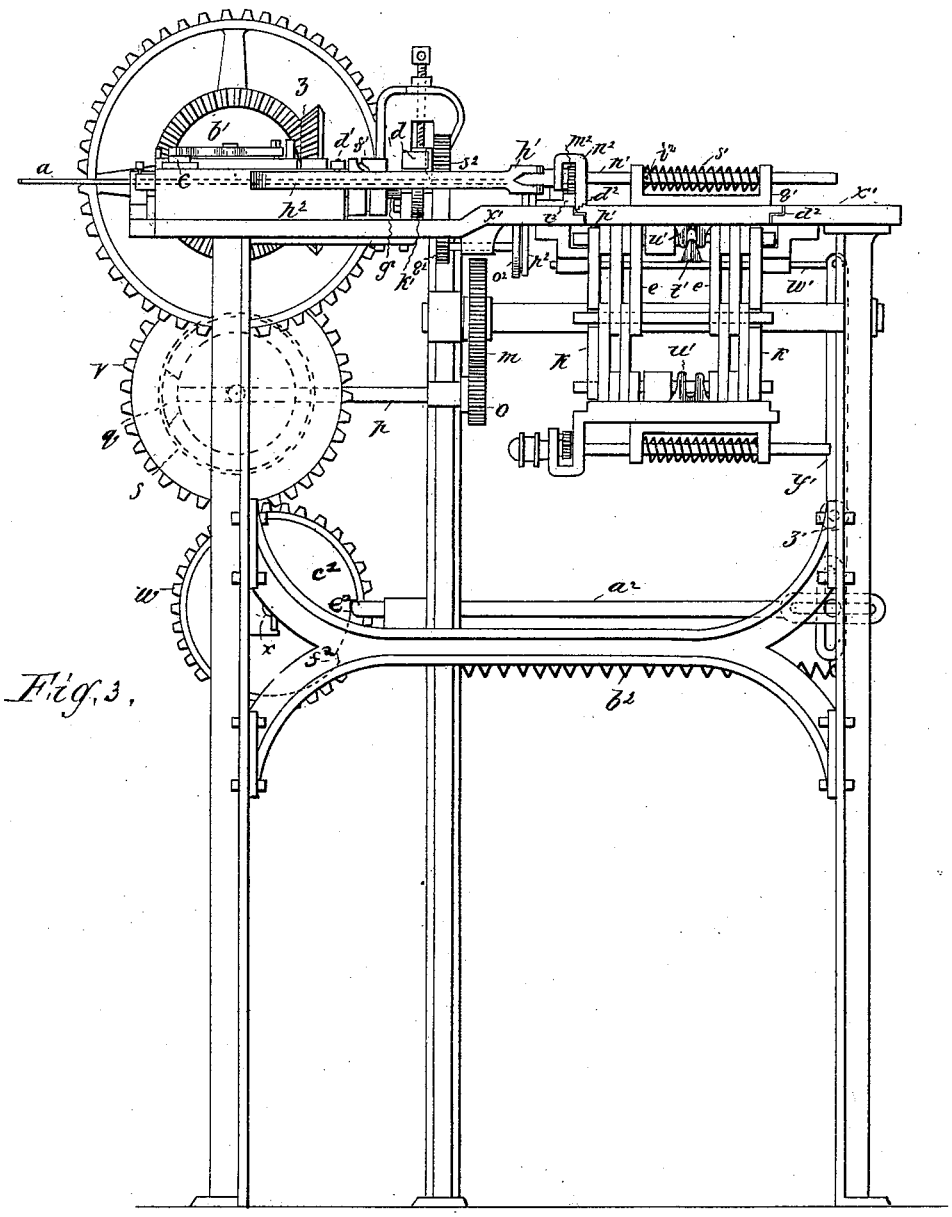

(No Model.) 5 Sheets—Sheet 4.

H. A. WILLIAMS.
MACHINE FOR MAKING HACKLE PINS, AWLS, &c.

No. 390,635. Patented Oct. 2, 1888.

WITNESSES:

INVENTOR
Henry A. Williams
BY
A. P. Thayer
ATTORNEY (No Model.) 5 Sheets—Sheet 5.
H. A. WILLIAMS.
MACHINE FOR MAKING HACKLE PINS, AWLS, &c.
No. 390,635. Patented Oct. 2, 1888.
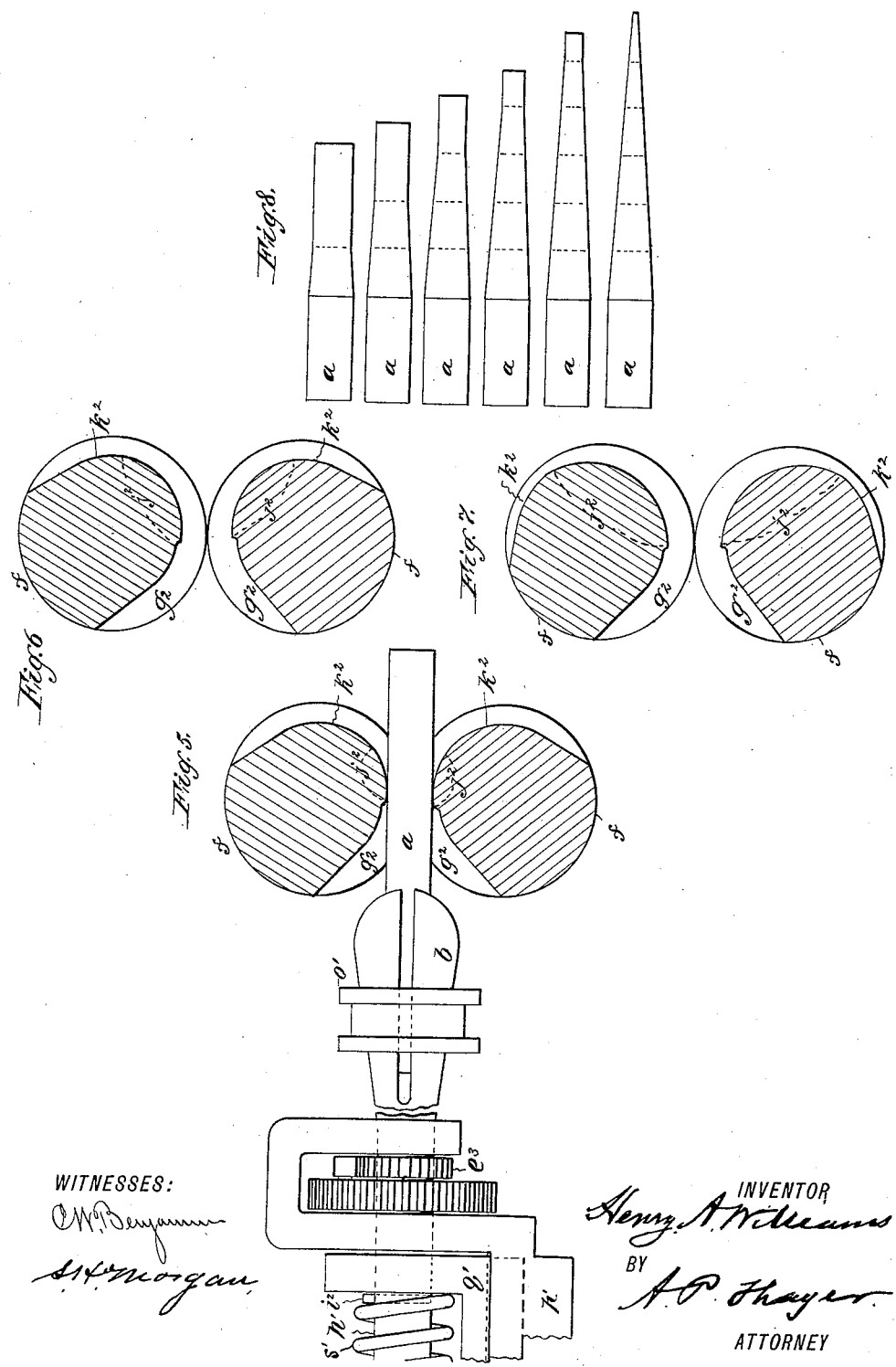
WITNESSES:
INVENTOR
Henry A. Williams
BY
A. P. Thayer
ATTORNEY

UNITED STATES PATENT OFFICE.

HENRY ALEXIS WILLIAMS, OF TAUNTON, MASSACHUSETTS.

MACHINE FOR MAKING HACKLE-PINS, AWLS, &c.

SPECIFICATION forming part of Letters Patent No. 390,635, dated October 2, 1888.

Application filed October 26, 1887. Serial No. 253,395. (No model.)

*To all whom it may concern:*

Be it known that I, HENRY ALEXIS WILLIAMS, a citizen of the United States, residing at Taunton, in the county of Bristol and State of Massachusetts, have invented certain new and useful Improvements in Machinery for Making Pointed-Wire Articles by Cold-Rolling; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention comprises automatic mechanism for feeding the wire from which the articles—such as hackle-pins, awls, lasting-tacks, and the like—are to be made, cutting the same to the required lengths, presenting the cut pieces successively to the several pairs of reducing-rolls for gradual reductions, and discharging the pointed articles, all as hereinafter fully described, reference being made to the accompanying drawings, in which—

Figure 1 is a plan view of part of the machine, showing the apparatus for the beginning of the process and part of the continuation of the same. Fig. 2 is a plan view of another part, showing the completing and discharging apparatus. Fig. 3 is an end elevation. Fig. 4 is a transverse section on line $xx$ of Fig. 1. Figs. 5, 6, and 7 are details illustrating the action of the rolls. Fig. 8 is a diagram illustrating the progressive operations of the rolls. Figs. 9, 10, and 11 are details of the apparatus for holding the wires and presenting them to the rolls. Fig. 12 is a detail of the wire-feeder.

The wire $a$ is successively fed into the chucks $b$ by the feeder $c$, and cut off in lengths by the cutters $d$. The chucks are shifted along intermittingly by the endless chains $e$ to each of the pairs of tapering rolls $f$, one after another, to which rolls the wires are also so presented by said chucks as to be repeatedly acted upon by each pair for gradual reduction in a series of about six pairs of rolls, (more or less,) having grooves partly taper and partly parallel, and from the finishing-rolls the wires are next presented to a discharging-chuck, $g$, by which they are taken from the holding-chucks and discharged from the machine, a wire-blank being supplied and another completed and discharged by each consecutive round of the machine's action.

The rolls $f$ are placed in a line lengthwise, and the carrying-chains are arranged along one side of and parallel with the line of rolls suitably for transferring the blanks along the rolls. The lower roll of each pair is geared with the shaft $h$, parallel to the line of rolls, by a pinion, $i$, and wheel $j$, and the rolls of each pair are geared together in the usual manner. The chains run on chain-carrying wheels $k$, geared at one end of the range with an intermediate shaft, $l$, by the wheel $m$, pinion $o$, shaft $p$, and the bevel-pinion $q$ and wheel $s$. Pinion $q$ is coupled with shaft $p$ by a clutch, $t$, which is in practice to be automatically shifted for periodically moving the chains to transfer the blanks from rolls to rolls and allowing the chains to rest while the blanks are being acted upon by the rolls, which revolve continuously and make several revolutions and as many actions on the blanks while the chains are at rest.

The shafts $l$ and $h$ are geared together by the wheels $u$ and $v$, of equal diameters, and they are geared by wheels $v$ and $w$ to the main driving shaft $x$, to which the power is to be applied in any approved way. The shaft $h$ turns the cam-shaft $y$ by the bevel-wheels $z$, and this shaft carries a cam, $a'$, which works the feeder $c$ by the lever $b'$. It also carries the cam $c'$ to work the wire-holding gripper $d'$ by the lever $e'$. It also carries cams $f'$ and $g'$ to work the chuck-closer $h'$ by the lever $i'$ and push-slide $j'$, and said shaft also carries the cam $k'$ to work the cutter-lever $l'$, by which the wires are cut to the lengths required.

The feeder-slide $c$ may consist of a clamp, Fig. 12, made by a swell of cam $a'$, acting under the end $m'$ to pinch the wire with sufficient grip to feed it forward, but so as to slip back along the wire for a new length, when the gripholder $d'$ takes effect, which begins just prior to the back shift of the feeder and continues until the beginning of the forward movement of said feeder; but any approved form of feeder may be used. The wires are thrust into the holding-chucks $b$, and are gripped thereby prior to being cut off, so as to be held during the pointing operations. These chucks may be contrived in any approved way, but in this case consist of spring-jaws on one end of a supporting-staff, $n'$, and tapering from the end backward, with a sliding collar, $o'$, to close them by shifting forward along the taper. The chuck-closer consists of the forked hook $h'$ on the end of the long-looped spring-bar $h^2$, attached to the end of lever $i'$, which vibrates for giving the forward and backward motions, and the slide $j'$ springs the fork back and holds it out of the way of the chucks while they are being brought into position by the chains for receiving the blanks.

The chuck-staffs are mounted on cross-plates $p'$ of the chains by slides $q'$, capable of shifting forward and backward on said plates, and the staffs are also fitted to shift lengthwise in the slides with a spring, $s'$, to each thrusting them forward to the limit of their movement in the slides toward the rolls. From the position where the chucks receive the blanks from the feeder the slides are carried forward by the chains over a bar, $t'$, made to shift the slides toward the rolls for presenting the wires to the rolls when the chains rest and to shift them back again before the starting of the chains to enable the wires to clear the housings of the rolls, said bar being made to vibrate, as required for this purpose, and being suitably connected therefor with the slides.

The means which I have adopted in this case for connecting the bar and the slides consist of guide-studs $u'$, projecting from the bottom of each slide $q'$, so as to embrace the bar $t'$ between them, said studs being curved or beveled each side suitably for passing the ends of the bar without conflict, and the end of the bar which enters between them being tapered for the same purpose. There may be guides along which the slides may be properly directed as they approach the bar by the tail ends of the staffs running against the guide.

For effecting the forward and backward movements of the bar $t'$, it is in this example attached to sliding bars $w'$, mounted in suitable ways in or under the table $x'$ and connected to levers $y'$ on rock-shaft $z'$, and operated by the sliding push-bar $a^2$ in the forward direction and by springs of any kind, as $b^2$, in the other direction, the push-bar being actuated by the cam $c^2$ on the main driving-shaft $x$.

The cross-plates $p'$ of the carrying-chains run in guideways $d^2$ of the table to prevent them from sagging, and also to resist the lateral thrusts of the chuck-slides and chuck-staffs. The clutch-shifting device for engaging the chain-shifting gear is to be timed for effecting the connection by clutch $t$ immediately after push-bar $a^2$ shifts back into the notch $e^2$ of cam $c^2$, and after shifting the blank-holding chucks along the distance from one pair of rolls to another it disconnects prior to the said push-bar being thrust forward again by the incline $f^2$ of the cam. In the forward position of the chuck slides the wire blanks $a$ are thrust between the rolls, as in Fig. 5, through the gaps $g^2$ of the roll-grooves, by the springs $s'$ to the limit of such movement by the pin or collar $i^2$ coming against the head of the slide $q'$. The taper parts $j^2$ of the roll-grooves then bite on the blank, forcing it back against the spring, reducing the blank for a short distance and to a practicable extent, and then the parallel parts $k^2$ of the grooves follow and reduce the rest of the blank to the size of the smaller part of the taper. The rolls make, say, four revolutions to each rest of the carrying chains and repeat the action as many times on each blank for effective and uniform work.

In Fig. 5, which is supposed to represent the pair of rolls first acting on the blank and effecting the first portion of the taper reduction, the taper portions $j^2$ of the grooves are only about half the length of the same portions of the grooves in the second pair of rolls, Fig. 6. In the third pair, Fig. 7, the said taper portions are about three times as long as in the first pair, and they increase in about the same measure throughout the series of rolls, all the taper portions being the same size, or substantially so, at the beginning, and all taking effect at the same place, or thereabout, on the blank—that is, at the beginning of the taper—but only very slightly effecting the previously-tapered portions, and each pair extending the taper a like amount, or thereabout, in the smaller portion, as illustrated in Fig. 7, thus effecting gradual reduction by easy stages in the most favorable conditions for the condensation of the metal in the most dense and tough state without any fracture or distortion whatever and without severe or undue strains of the working apparatus. At the same time the blanks are caused to rotate for insuring the desired symmetrical round form and uniformity of condensation by changing the position circumferentially for every action of the rolls, so that the effects of the rolls are substantially alike all around the wires. In this case the rotation of the blanks is effected by the reciprocating toothed rack $l^2$, with which the chuck-staffs are geared by the pinions $m^2$ on them and confined by the yokes $n^2$ of the carrying-plates $p'$, so that said pinions are kept in gear with the rack while the staffs slide forward and backward with relation to the rolls.

The rack extends along the front of all the rolls and the chuck-staffs come into gear with it and pass away from it as they are carried along it by the chains. A stationary rack which only rotates the blanks as they are moved along will change the blanks between the pairs of rolls and to some extent effect the same object.

The rack is arranged in suitable slideways on the table, and is coupled with the crank-pin of the disk $o^2$ by the connecting-rod $p^2$, and the disk is geared with the cam-shaft $y$ by the pinion $q^2$ on its shaft and wheel $s^2$ on said cam-shaft. The staffs are preferably geared with the rack by ratchets $e^3$ and a pawl, $f^3$, to allow the back movement of the rack without turning the wires while in the grip of the rolls, the pinions $m^2$ being fitted loosely on the shafts, but the ratchets being feathered thereon suitably for the purpose. The ratchet mechanism may, however, be dispensed with and the staffs positively geared with the rack as the rack shifts slowly, and may be so timed with relation to the rolls that they will grip the blanks while the rack rests during the changes of its movements and while the crank-pin to which it is connected is passing its centers; but should the chucks be in rotation while the blanks are gripped by the rolls the chucks will shift on the blanks sufficiently to avoid any objectionable conflict. From the finishing-rolls the pointed wires pass along to the discharging-chuck $g$, which consists of spring-jaws which in the forward movement are pressed on and grip the wire and at the same time push back the collar $o'$ by pusher $g^3$, so as to open the holding-chuck and release the wire from it. Then chuck $g$ goes back and is opened by the stud $t^2$, so that it lets the wire fall. Chuck $g$ is mounted on the slide $u^2$ connected to crank-shaft $y^2$ and fitted in another slide, $v^2$, in which it is bound by the gib $w^2$ and set-screws $x^2$, so that both slides move together, except when slide $v^2$ is arrested by the stops $a^3$ and $b^3$. The stud $t^2$ is fixed in slide $v^2$ and extends upward through the slot separating the spring-jaws, so that when slide $v^2$ is arrested by stop $b^3$ in its forward movement the chuck moves on, leaving the stud $t^2$ in a wider part of the slot, allowing the jaws to close and grip the wire. The chuck $g$ then shifts back with the wire and thus removes it from the holding-chuck, and it opens and drops the wire, when stop $a^3$ arrests slide $v^2$, and the more contracted part of the slot of the spring-jaws returns along stud $t^3$ and causes the opening of the jaws.

The crank-shaft $y^2$ operating the discharging-chucks is geared by the pinion $d^3$ with the last roll-driver $j$ of the series.

I use a separate pair of rolls for each pass or groove instead of two or more passes in one pair, as might be arranged, because it is more desirable for certain reasons to use such small rolls as would not have the necessary strength of cross section for acting on more than one wire; but the general plan of the invention is the same whether one or more pairs are employed.

I reserve the method or process of pointing wires herein described for a separate application for a patent.

What I claim, and desire to secure by Letters Patent, is—

1. The combination, in a wire-pointing machine, of a series of roll grooves or passes having the opening gap for admitting the wires, the taper section following the opening gap, and the parallel section following the taper section, the taper section of each successive pass being substantially uniform in size of the beginning, but successively longer than said part of the preceding groove, and the parallel section being correspondingly reduced, substantially as described.

2. The combination, in a wire-pointing machine, of a series of grooves or passes located at intervals along the axis of the rolls, an intermittingly-shifting endless carrier, and a series of holding-chucks on said carrier, adapted to hold and shift the blanks along the rolls from pass to pass and also to shift the blanks forward to and backward from the rolls, substantially as described.

3. The combination, in a wire-pointing machine, of a series of grooves or passes located at intervals along the axis of the rolls, an intermittingly-shifting endless carrier, a series of holding-chucks on said carrier adapted to hold and present the blanks to the different passes successively, and a feeder and cutter that insert the blanks in the holding-chucks, substantially as described.

4. The combination, in a wire-pointing machine, of a series of pointing grooves or passes located at intervals along the axis of the rolls, an intermittingly-shifting endless carrier, a series of holding-chucks on said carrier adapted to hold and present the blanks to the different passes successively, and a discharging-chuck that removes the blanks from the holding-chucks and discharges them from itself, substantially as described.

5. The combination, in a wire-pointing machine, of a series of pointing grooves or passes located at intervals along the axis of the rolls, an intermittingly-shifting endless carrier, a series of holding-chucks on said carrier adapted to hold and present the blanks to the different passes successively, a feeder and cutter that insert the blanks in the holding-chucks, and a discharging-chuck that removes the blanks from the holding-chucks and discharges them from itself, substantially as described.

6. The combination, in a wire-pointing machine, of a series of pointing grooves or passes located at intervals along the axis of the rolls, the intermittingly-shifting endless carrier, the series of holding-chucks on said carrier adapted to hold and present the blanks to the different passes successively, and the shifting-bar adapted to shift the chucks toward and from the rolls alternately with the shifting of the chucks along the rolls, substantially as described.

7. The combination, in a wire-pointing machine, of a series of pointing grooves or passes located at intervals along the axis of the rolls, the intermittingly-shifting endless carrier, the series of holding-chucks on said carrier adapted to hold and present the blanks to the different passes successively, the shifting-bar adapted to shift the chucks toward and from the rolls alternately with the shifting of the chucks along the rolls, the feeder and cutter that insert the blanks in the holding-chucks, and the guide that controls the chucks relatively to the feeder and cutter, substantially as described.

8. The combination, in a wire-pointing machine, of the endless intermittingly-shifting carrier, the series of holding-chucks on said carrier, the feeder and cutter that insert the blanks in said chucks, and the chuck-closing fork, said fork having a lateral movement for clearing the chucks when coming into position and for engaging them afterward, and a movement lengthwise of the chuck to shift the chuck-closing ring, substantially as described.

9. The combination, in a wire-pointing machine, of the endless intermittingly-shifting carrier, the series of holding-chucks on said carrier, the feeder and cutter that insert the blanks in said chucks, the chuck-closing fork, the push-slide for pushing the fork clear of the shifting chucks, and the vibrating lever effecting the chuck-closing movement of the fork, substantially as described.

10. The combination, in a wire-pointing machine, of a series of pointing grooves or passes located at intervals along the axis of the rolls, the intermittingly-shifting endless carrier, the series of holding-chucks on said carrier adapted to present the blanks to the different passes successively, and the chuck-rotating gear for turning the blanks and distributing the effects of the rolls on the blanks, substantially as described.

11. The combination, in a wire-pointing machine, of a series of pointing grooves or passes located at intervals along the axis of the rolls, the intermittingly-shifting endless carrier, the series of holding-chucks on said carrier adapted to hold and present the blanks to the different passes successively, the shifting bar adapted to shift the chucks toward and from the rolls alternately with the shifting of the chucks along the rolls, the discharging-chuck, and the guide controlling the holding chucks with relation to the discharging-chuck, substantially as described.

12. The combination, with the holding-chucks having the closing-collar, of the discharging-chuck having the collar-shifting stud adapted to open the holding-chucks, and also having spring-jaws adapted to grip and remove the wires from the holding-chucks, substantially as described.

13. The combination of the spring-jaws of the discharging-chuck on the slide connected with the crank-shaft, and the stop-slide having the jaw-slide fitted in and working it, and also having the stops and the jaw-opening stud, substantially as described.

14. The combination, with the rolls having a series of wire-pointing grooves, of the series of holding-chucks mounted on the endless intermittingly-shifting chain by the chuck-slides fitted to reciprocate toward and from the rolls in the cross-plates of the chain, and also mounted to reciprocate in said chuck-slides, and having a retracting-spring, substantially as described.

15. The combination of the roll-train and the chuck-carrying chain, respectively geared with the main shaft, and the chuck-slide shifting-bar actuated by the cams on said main shaft through the instrumentality of the push-slides, the bar-carrying slides in the table, and the levers connecting said bar-carrying slides and push-slides, substantially as described.

16. The combination, with the roll-train, the chuck-carrying chain, and the chucks thereon, of the cam-shaft geared with the roll-drivers, the wire-feeder, gripper, and cutter, and the feeder-cam, gripper-cam, and cutter-cam on said shaft, substantially as described.

17. The combination, with the roll-train, the chuck-carrying chain, and the chucks thereon, of the cam-shaft geared with the roll-driver, the wire-feeder, gripper, cutter, chuck-closer, and the feeder-cam, gripper-cam, cutter-cam, and the chuck-closer cams, substantially as described.

In testimony whereof I affix my signature in presence of two witnesses.

HENRY ALEXIS WILLIAMS.

Witnesses:
 ELISHA T. JACKSON,
 BENJ. L. WOOD.